United States Patent
Morita et al.

(10) Patent No.: US 12,492,329 B2
(45) Date of Patent: Dec. 9, 2025

(54) SEAL MEMBER

(71) Applicant: Sumitomo Riko Company Limited, Aichi (JP)

(72) Inventors: Takahiro Morita, Aichi (JP); Yasuyuki Hayasaki, Aichi (JP); Ryosuke Yamaoka, Aichi (JP); Risa Tajima, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 492 days.

(21) Appl. No.: 18/298,330

(22) Filed: Apr. 10, 2023

(65) Prior Publication Data
US 2023/0242798 A1    Aug. 3, 2023

Related U.S. Application Data

(63) Continuation of application No. PCT/JP2021/042921, filed on Nov. 24, 2021.

(30) Foreign Application Priority Data

Nov. 27, 2020  (JP) .................................. 2020-197017

(51) Int. Cl.
*C08L 83/04*    (2006.01)
*C09K 3/10*     (2006.01)
(Continued)

(52) U.S. Cl.
CPC .... *C09K 3/1018* (2013.01); *C09K 2003/1059* (2013.01); *C09K 2003/1075* (2013.01);
(Continued)

(58) Field of Classification Search
CPC ........................................................ C08L 83/04
(Continued)

(56) References Cited

U.S. PATENT DOCUMENTS

| | | | |
|---|---|---|---|
| 8,267,720 B2 * | 9/2012 | Ishida ................ | H01R 13/5208 439/589 |
| 2011/0086545 A1 * | 4/2011 | Ishida ................ | H01R 13/5208 439/587 |

(Continued)

FOREIGN PATENT DOCUMENTS

| | | | |
|---|---|---|---|
| JP | 2016058138 | | 4/2016 |
| JP | 2018053237 | | 4/2018 |
| JP | 2020-143244 | * | 9/2020 |

OTHER PUBLICATIONS

"International Search Report (Form PCT/ISA/210) of PCT/JP2021/042921", mailed on Feb. 15, 2022, with English translation thereof, pp. 1-5.

*Primary Examiner* — Margaret G Moore
(74) *Attorney, Agent, or Firm* — JCIPRNET

(57) ABSTRACT

This seal member is a cured product of a silicone rubber composition that comprises a silicone rubber and silica particles, and has multiple insertion holes into which counterpart members are inserted; and this seal member satisfies the following conditions (a) to (d). (a) If X (parts by mass) is the content of the silica particles relative to 100 parts by mass of a base polymer of the silicone rubber, (elastic recovery rate (%))/(X (parts by mass)) is from 3.6 to 9.6. (b) The type A durometer hardness is from 15 to 30. (c) The tensile strength at break is 2.1 MPa or more. (d) The coefficient of kinetic friction of the surfaces of the insertion holes is 2.5 or less.

9 Claims, 2 Drawing Sheets

(51) Int. Cl.
  *H01R 13/40* (2006.01)
  *H01R 13/52* (2006.01)
(52) U.S. Cl.
  CPC ............... *C09K 2200/0247* (2013.01); *C09K 2200/0685* (2013.01); *H01R 13/40* (2013.01); *H01R 13/52* (2013.01)
(58) Field of Classification Search
  USPC ....... 528/15, 31; 524/588; 525/478; 428/447
  See application file for complete search history.

(56) References Cited

U.S. PATENT DOCUMENTS

2022/0135800 A1* 5/2022 Okada .................. C09D 183/04
  524/493
2022/0162395 A1* 5/2022 Okada ..................... C08L 83/04

* cited by examiner

SEAL MEMBER

CROSS-REFERENCE TO RELATED APPLICATION

The present application is a continuation of PCT/JP2021/042921, filed on Nov. 24, 2021, and is related to and claims priority from Japanese patent application no. 2020-197017, filed on Nov. 27, 2020. The entire contents of the aforementioned application are hereby incorporated by reference herein.

BACKGROUND

Technical Field

The disclosure relates to a silicone rubber-based seal member including multiple insertion holes into which counterpart members are inserted.

Description of Related Art

A mat seal is known which is disposed at a wire lead-out part of a connector housing and seals between the wire and the connector housing (see, for example, Patent Literature 1). The mat seal is made of an elastic material such as rubber and has multiple insertion holes penetrating in the thickness direction, and wires are inserted through each of the insertion holes. A terminal is attached to the tip of the wire. When the wire is to be inserted through the insertion hole of the mat seal, first, the terminal is inserted into the insertion hole and is passed through the insertion hole while being expanded. The terminal passed through the insertion hole is inserted into the terminal accommodating chamber, and the wire extending from the terminal is disposed in the insertion hole. An annular lip part is formed on the inner peripheral surface of the insertion hole, and the lip part is in close contact with the outer periphery of the wire, thereby suppressing moisture from entering the connector housing.

RELATED ART

Patent Literature

[Patent Literature 1] Japanese Patent Application Laid-Open No. 2016-58138
[Patent Literature 2] Japanese Patent Application Laid-Open No. 2018-53237

SUMMARY

Technical Problem

In recent years, connector housings have become smaller, and the number of wires inserted has increased. Along with this, mat seals are also required to have an increased number of insertion holes and a reduced size. Most of the terminals attached to the tips of wires are made of metal and have corners. Therefore, when the terminal passes through the insertion hole, the surface of the insertion hole may be damaged, resulting in deterioration of the sealing performance.

In this regard, Patent Literature 1 discloses that silicone rubber mixed with polyrotaxane is used as a material for seal members used in mat seals and the like, thereby making the molecules of the silicone rubber slippery and reducing the scratchability of the seal member. However, polyrotaxanes are relatively expensive, which increases costs. In addition, although Patent Literature 1 does not describe how the occurrence of scratches is reduced, paragraph [0027] states that polyrotaxane may be blended in order to easily disperse the stress applied from the outside.

Conventionally, for damage to the seal member, it has been considered a problem when a cut that exists on the surface develops into a "crack." For this reason, as a measure for suppressing damage (cracks), studies have been made to increase the tear strength in consideration of development of cuts. Patent Literature 1 also mentions tear strength as an evaluation item for properties (Tables 1 and 2). In addition, as a result of the inventors' intensive studies on the damage to the seal member, in order to suppress the deterioration of the sealing performance, it has been found that it is necessary to suppress the cut itself rather than the "crack" in the state where the cut has developed. Therefore, the problem cannot be solved by improving the tear strength alone, and conventional materials cannot sufficiently suppress the occurrence of cut damages.

In addition, Patent Literature 2 describes a silicone rubber including a vinyl group-containing organopolysiloxane and silica particles, and having low hardness, high tear strength and low permanent tensile strain. However, as described above, it is not possible to suppress the occurrence of cuts only by improving the tear strength. Further, the use of the silicone rubber described in Patent Literature 2 is medical moldings such as medical tubes (paragraph [0126]). Patent Literature 2 describes reduction of permanent tensile strain as an issue focused on this application. Permanent tensile strain is a property that indicates that elongation remains after being stretched without returning to its original shape (tensile residual strain), and is recognized as a different property from permanent compression strain in which strain remains after compression (paragraph [0011]). In Patent Literature 2, damage caused by inserting/removing a counterpart member such as a terminal is not considered.

In view of the above, the disclosure provides a silicone rubber-based seal member that is less likely to be cut into an insertion hole when a counterpart member is inserted or removed.

Solution to Problem

In view of the above, a seal member according to the disclosure is a seal member that includes multiple insertion holes into which counterpart members are inserted, and the seal member is a cured product of a silicone rubber composition including a silicone rubber and silica particles and satisfies following conditions (a) to (d).

(a) if X parts by mass is the content of the silica particles relative to 100 parts by mass of a base polymer of the silicone rubber, elastic recovery rate (%)/X (parts by mass)=3.6 to 9.6;
(b) the type A durometer hardness is 15 or more and 30 or less;
(c) the tensile strength at break is 2.1 MPa or more; and
(d) the coefficient of kinetic friction of a surface of the insertion hole is 2.5 or less.

Effects

The seal member is a cured product of a silicone rubber composition including a silicone rubber and silica particles. By containing silica particles, the hardness of the seal member may be easily adjusted, and the mechanical strength such as tensile strength may be easily improved. Further-more, the seal member of the disclosure satisfies the above conditions (a) to (d). These four conditions were found by the inventors and were specified for suppressing the occurrence of cut damages.

As specified in the condition (a), in the seal member of the disclosure, the ratio of the elastic recovery rate to the content of silica particles is 3.6 or more and 9.6 or less. The elastic recovery rate is the elastic deformation power $\eta_{IT}$ (%) measured by the indentation test method. The closer the elastic recovery rate is to 100%, the easier it is to elastically deform; that is, the easier it is to return to its original state after deformation. The inventors of the disclosure have found that both the elastic recovery rate of the seal member and the content of silica particles have a great effect on the cut damage that occurs when the counterpart member is inserted into and removed from the insertion hole of the seal member, and have specified a range in which the ratio of the two is effective in suppressing cut damages. Focusing only on the elastic recovery rate, the greater the value, the greater the resilience against repeated deformation, and thus it seems to be an indicator of cut damage suppression. However, even if the elastic recovery rate is large, if the content of silica particles is small, the rubber itself becomes fragile, and cut damage is likely to occur. Thus, it is not possible to suppress the occurrence of cut damages only by specifying one of the elastic recovery rate and the content of silica particles. By satisfying the condition (a), both the elastic recovery rate and the strength of the rubber (seal member) may be achieved. As a result, the residual strain due to compression and tension accompanying insertion and removal of the counterpart member is reduced, and the fatigue fracture of the seal member is less likely to occur even after repeated insertion and removal.

As specified in the condition (b), the seal member of the disclosure has the type A durometer hardness of 15 to 30. By satisfying the condition (b), the hardness of the rubber (seal member) may be optimized, and the occurrence of cut damages may be suppressed.

As specified in the condition (c), the seal member of the disclosure has a tensile strength at break of 2.1 MPa or more. When the condition (c) is satisfied, the intermolecular bonds of the rubber become strong, so the rubber molecules are less likely to be broken by the mechanical and thermal loads applied when the counterpart member is inserted and removed. As a result, the mechanical strength of the rubber (seal member) may be ensured, and the occurrence of cut damages may be suppressed.

As specified in the condition (d), the coefficient of kinetic friction of the surface of the insertion hole of the seal member of the disclosure is 2.5 or less. By satisfying the condition (d), the friction on the surface of the insertion hole (surface in sliding contact with the counterpart member) is reduced. As a result, the mechanical and thermal loads applied when the counterpart member is inserted and removed are reduced, and the rubber molecules are less likely to be broken. As a result, it is possible to suppress the occurrence of cut damages.

As described above, according to the seal member of the disclosure, by satisfying the conditions (a) to (d), even if the counterpart member is repeatedly inserted and removed, the insertion hole is less likely to be cut. Therefore, the seal member of the disclosure has good durability and high reliability.

DESCRIPTION OF EMBODIMENTS

Figure 1:
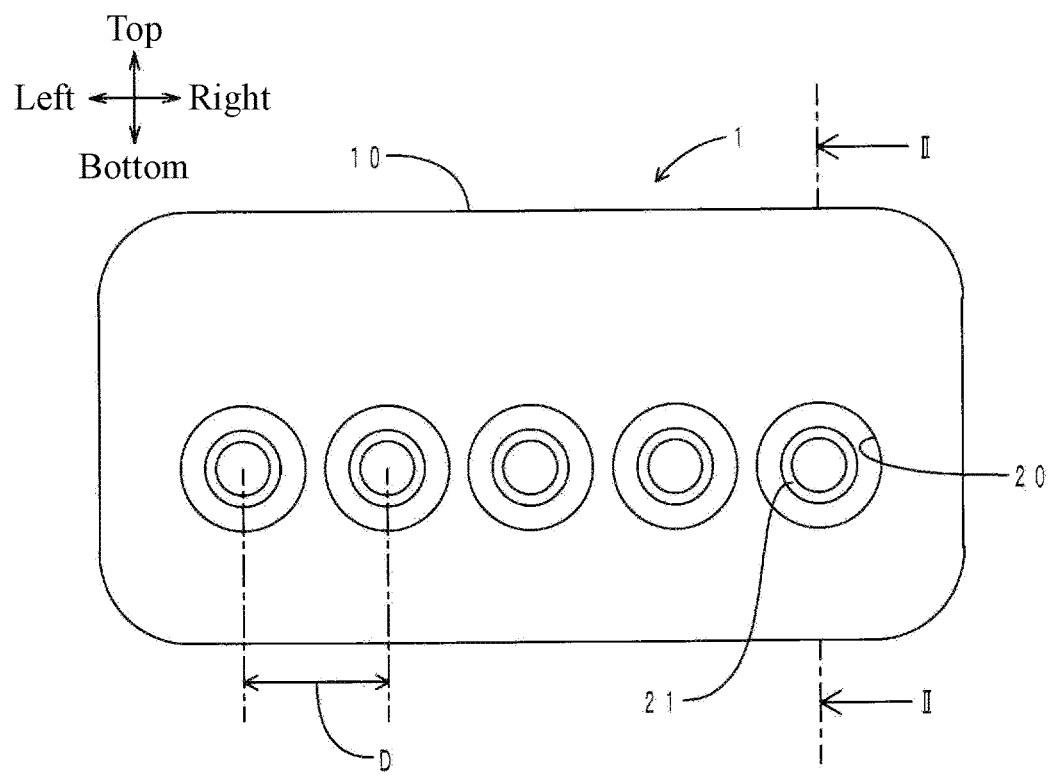
FIG. 1 is a front view of a mat seal that is an embodiment of the seal member of the disclosure.
Figure 2:
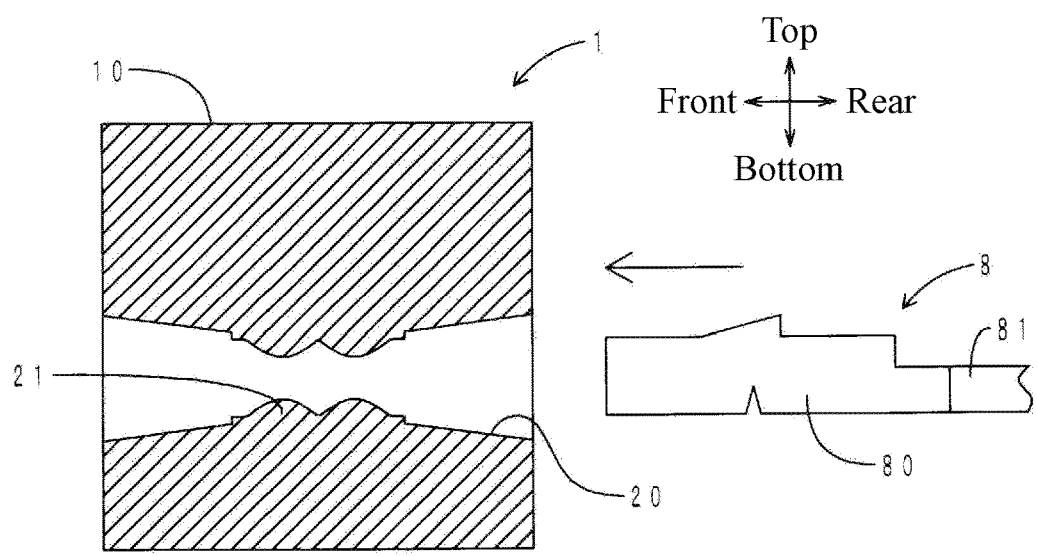
FIG. 2 is a cross-sectional view taken along the line II-II of FIG. 1.

First, an example used as a mat seal for a waterproof connector will be described as an embodiment of the seal member of the disclosure. FIG. 1 shows a front view of the mat seal of this embodiment. FIG. 2 shows a cross-sectional view taken along the line II-II of FIG. 1. As shown in FIGS. 1 and 2, the mat seal 1 has a body 10 and five insertion holes 20.

The body 10 has a rectangular flat plate shape and is a cured product of a silicone rubber composition including dimethylpolysiloxane having a terminal vinyl group (molecular weight 40,000), organohydrogenpolysiloxane, silica particles, and phenyl group-containing silicone oil. In the body 10, the content of silica particles is 20 parts by mass relative to 100 parts by mass of dimethylpolysiloxane having a terminal vinyl group; the value of "elastic recovery rate/silica particle content" of condition (a) is 4.4; the type A durometer hardness is of condition (b) is 30; and the tensile strength at break of condition (c) is 4.4 MPa.

Each of the five insertion holes 20 is formed through the body 10 in the thickness direction. The five insertion holes 20 each have a circular opening when viewed from the front, and are disposed in a line in the left-right direction at equal intervals. A distance D between adjacent insertion holes 20 is 2.6 mm. Each of the five insertion holes 20 has a lip part 21 protruding inward. Two lip parts 21 are disposed in parallel in the thickness direction of the body 10 and have an annular shape. An oil film (not shown) is disposed on the surface (inner peripheral surface) of the insertion hole 20. The oil film is formed by bleeding phenyl group-containing silicone oil, which is a component of the silicone rubber composition, onto the surface of the insertion hole 20. The coefficient of kinetic friction of the surface of the insertion hole of condition (d) is 0.9. The shape and size of the five insertion holes 20 are all the same.

As shown in FIG. 2, wires 8 with terminals are inserted into the five insertion holes 20 from behind. The terminal-equipped wire 8 includes a terminal 80 and a wire 81. The terminal 80 is made of metal and has a rectangular parallelepiped shape with protrusions. The terminal 80 is attached to the tip (front end) of the wire 81. The terminal-equipped wire 8 is included in the concept of the counterpart member in the disclosure.

A waterproof connector is mainly configured by a mat seal 1, an outer housing (connector housing) and an inner housing (not shown). The outer housing has a box-like shape having a rectangular tubular side wall and a rear wall that closes the rear end opening of the side wall, and five terminal insertion holes through which the terminal-equipped wires 8 can pass are formed in the rear wall. The mat seal 1 is disposed inside the rear wall of the outer housing, and the insertion holes 20 are disposed so as to correspond to the terminal insertion holes. The rear surface of the mat seal 1 is disposed in close contact with the rear wall of the outer housing. The inner housing is disposed in close contact with the front surface of the mat seal 1. The inner housing has a terminal accommodating part that accommodates the terminal 80 that has passed through the insertion hole 20.

The terminal-equipped wire 8 is inserted into the insertion hole 20 of the mat seal 20 from the terminal insertion hole of the outer housing. The terminal 80 moves forward while expanding the insertion hole 20, and after passing through the insertion hole 20, is accommodated in the terminal accommodating part of the inner housing. The lip part 21 of the insertion hole 20 is in close contact with the outer periphery of the wire 81 extending rearward from the terminal 80, thereby sealing the gap between the insertion hole 20 and the wire 81.

The mat seal 1 of this embodiment is a cured product of a silicone rubber composition that includes a silicone rubber and silica particles, and satisfies four conditions (a) to (d). Therefore, in the mat seal 1, even if the terminal 80 is repeatedly inserted and removed, the insertion hole 20 is less likely to be damaged. Therefore, the mat seal 1 has good durability and high reliability.

Although one embodiment of the seal member of the disclosure has been described above, the seal member of the disclosure is not limited thereto, and various modifications and improvements that may be made by those skilled in the art may be implemented without departing from the spirit of the disclosure.

[Configuration of Seal Member]

The seal member of the disclosure includes multiple insertion holes into which counterpart members are inserted. The type, material, shape, size, and the like of the counterpart member are not particularly limited. For example, if the counterpart member is made of metal and has corners, as in the terminal of the above-described embodiment, a cut damage is likely to occur. Therefore, the seal member of the disclosure, which is highly effective in suppressing the occurrence of cuts, is suitable for such a counterpart member.

The number of insertion holes is not particularly limited as long as it is two or more. The number of insertion holes, the form of arrangement, the shape of the openings, the diameter of the openings, and the like may be appropriately determined according to the use of the seal member, the number, material, shape, size, and the like of the counterpart members. The insertion hole may or may not pass through the seal member in the thickness direction. For example, in the case where the seal member has a flat plate-like body and multiple insertion holes are formed in the body, if the distance between the insertion holes is short, the insertion holes tend to interfere with each other when the counterpart member is inserted and removed. That is, when the counterpart member is inserted into an arbitrary insertion hole, the adjacent insertion hole is likely to be pressed and narrowed. In this case, when the counterpart member is inserted into an adjacent insertion hole, it is likely that a cut damage will occur. Thus, it is expected that the greater the number and density of the insertion holes, the more likely a cut damage will occur. From the viewpoint of reducing interference between the insertion holes, when the body having the insertion holes is viewed from the direction in which the counterpart member is inserted, it is desirable that the distance between adjacent insertion holes is 1.3 mm or more and 8.8 mm or less. Here, the distance between adjacent insertion holes means the distance between the central axes of adjacent insertion holes.

From the viewpoint of reducing the coefficient of kinetic friction of the surface of the insertion hole, it is desirable that an oil film is disposed on at least a part of the surface of the insertion hole. The oil film may be formed by bleeding the oil contained in the silicone rubber composition onto the surface of the insertion hole, or may be formed by coating oil to the surface of the insertion hole. The oil that forms the oil film will be described later.

[Component and Properties of Seal Member]

The seal member of the disclosure is a cured product of a silicone rubber composition that includes a silicone rubber and silica particles. As a base polymer for the silicone rubber, those widely known as organopolysiloxanes may be used. The base polymer may be a liquid rubber or a solid (millable) rubber. The liquid rubber is desirable in that it may be molded with high dimensional accuracy, including the lip part and the like.

Organopolysiloxanes have predetermined reactive groups according to their cross-linking mechanism (curing mechanism). Reactive groups include alkenyl groups (vinyl groups, allyl groups, butenyl groups, pentenyl groups, hexenyl groups, and the like), silanol groups, and the like. The former organopolysiloxanes with alkenyl groups are cross-linked by a peroxide cross-linking reaction using an organic peroxide as a cross-linking agent, or an addition reaction using an organopolysiloxane (organohydrogenpolysiloxane) having a hydrosilyl group (SiH group) as a cross-linking agent. Hydrosilylation catalysts such as platinum catalysts may be used in combination for the addition reaction. The latter organopolysiloxanes with silanol groups are cross-linked by a condensation reaction. A condensation cross-linking agent may be used in combination for the condensation reaction.

From the viewpoint of obtaining a cured product having good elasticity, it is desirable that the base polymer configuring the silicone rubber includes an organopolysiloxane having at least two alkenyl groups in one molecule, and the cross-linking agent includes an organohydrogenpolysiloxane.

Organopolysiloxanes have organic groups in addition to reactive groups. An organic group is a monovalent substituted or unsubstituted hydrocarbon group. Examples of unsubstituted hydrocarbon groups include alkyl groups such as methyl group, ethyl group, propyl group, butyl group, hexyl group and dodecyl group, aralkyl groups such as 3-phenylethyl and 3-phenylpropyl groups, and the like. Examples of substituted hydrocarbon groups include chloromethyl groups, 3,3,3-trifluoropropyl groups, and the like. Organopolysiloxanes having a methyl group as an organic group are desirable from the viewpoint of ease of synthesis. Organopolysiloxanes are preferably linear, but may be branched or cyclic.

Although the number of hydrosilyl groups included in the organohydrogenpolysiloxane of the cross-linking agent is not particularly limited, it is preferably 2 or more and 50 or less from the viewpoint of high curing speed and good stability. In this case, it is desirable that the hydrogen atoms of the hydrosilyl groups are bonded to different Si atoms. Organohydrogenpolysiloxanes may be chain or cyclic. Examples of organohydrogenpolysiloxanes include a methylhydrogenpolysiloxane having both ends capped with trimethylsiloxane groups and a dimethylsiloxane/methylhydrogensiloxane copolymer having both ends capped with trimethylsiloxane groups, and the like. The blending amount of the cross-linking agent is preferably 0.1 parts by mass or more and 40 parts by mass or less relative to 100 parts by mass of the organopolysiloxane having at least two alkenyl groups in one molecule.

Although the molecular weight of the silicone rubber base polymer is not particularly limited, the molecular weight is preferably 30,000 or more and 120,000 or less from the viewpoint of easily satisfying the conditions (a) and (b). More preferably, the molecular weight is 33,000 or more and 100,000 or less. If the molecular weight is less than 30,000, the cured product (seal member) will be hard. Therefore, the stress generated when the counterpart member is inserted or removed increases, which is more likely to cause cut damages. Conversely, when the molecular weight exceeds 120,000, the length of the cross-linking point becomes long and the elastic recovery rate becomes small. It makes cut damages more likely to occur. In this disclosure, molecular weight means weight average molecular weight unless otherwise specified.

In order to accelerate the cross-linking reaction of the base polymer, a suitable catalyst may be added. Examples of the aforementioned hydrosilylation catalysts include platinum catalysts, ruthenium catalysts, orthium catalysts, and the like. Examples of platinum catalysts include particulate platinum, platinum black, platinum-supported activated carbon, platinum-supported silica, chloroplatinic acid, alcohol solution of chloroplatinic acid, olefin complex of platinum, alkenylsiloxane complex of platinum, and the like. These may be used alone or in combination of two or more.

Fumed silica, calcined silica, precipitated silica, and the like may be used as the silica particles. The silica particles may be surface-treated. For example, those subjected to hydrophobizing treatment are preferable in that they are good in dispersibility in silicone rubber and may easily secure sufficient mechanical strength. The blending amount of silica particles may be appropriately adjusted to satisfy the conditions (a) to (c). For example, the blending amount should be 10 parts by mass or more and 25 parts by mass or less relative to 100 parts by mass of the base polymer. As the amount of silica particles increases, the cured product (seal member) becomes harder and the elastic recovery rate becomes smaller. Conversely, when the amount of silica particles is reduced, the cured product becomes softer and the elastic recovery rate becomes larger. However, if the amount of silica particles is too small, the mechanical strength of the cured product will decrease.

As described above, from the viewpoint of reducing the coefficient of kinetic friction of the surface of the insertion hole, it is desirable that an oil film is disposed on at least a part of the surface of the insertion hole. The oil film may be formed by allowing oil, which is a component of the silicone rubber composition, to bleed onto the surface of the insertion hole, or may be formed by separately coating oil to the surface of the insertion hole. In the former case, the silicone rubber composition desirably has an oil that has low compatibility with silicone rubber. Examples of oils that have low compatibility with silicone rubber and bleeds easily include phenyl group-containing oils, ether-modified oils, and liquid paraffin oils. One selected from these may be used, or a mixture of two or more may be used. Among them, phenyl group-containing oils are preferable from the viewpoint that it is easy to control the timing of bleeding from the silicone rubber and that good moldability may be ensured. The blending amount of oil may be appropriately adjusted to satisfy the condition (d). For example, the blending amount should be 0.5 parts by mass or more and 15 parts by mass or less relative to 100 parts by mass of the base polymer. More preferably, the blending amount is 4 parts by mass or more and 10 parts by mass or less. In the latter case (when oil is coated to the surface of the insertion hole), the type of oil is not particularly limited, but it is desirable that the coated oil does not easily soak into the silicone rubber and stays on the surface. From this viewpoint, as in the former case, it is desirable to use an oil that has low compatibility with silicone rubber.

The silicone rubber composition may include additives other than the above-mentioned materials as long as the conditions (a) to (d) are satisfied. Examples of additives include cross-linking accelerators, cross-linking retarders, cross-linking auxiliaries, reinforcing materials, anti-aging agents, softeners, plasticizers, lubricants, heat stabilizers, flame retardants, flame retardant auxiliaries, UV absorbers, and antirust agents, pigments, and the like.

The seal member of the disclosure satisfies the following four conditions (a) to (d).

(a) Elastic Recovery Rate (%)/X (Parts by Mass)=3.6 to 9.6

The elastic recovery rate is the elastic deformation power measured by the indentation test method. The elastic deformation power $\eta_{IT}$ (%) is calculated from the following equation (i) by obtaining the plastic deformation ($W_{plast}$) and elastic deformation ($W_{elast}$) from an obtained load-displacement curve, which is created by pressing an indenter into the surface of a test piece, and taking the total mechanical amount as $W_{total}$ ($=W_{plast}+W_{elast}$).

$$\eta_{IT}=W_{elast}/W_{total}\times 100 \qquad (i)$$

In this disclosure, the calculated elastic deformation power $\eta_{IT}$ (%) is referred to as the elastic recovery rate, and the value of the elastic recovery rate is divided by the content of silica particles (X parts by mass) relative to 100 parts by mass of the base polymer to obtain "elastic recovery rate (%)/X (parts by mass)" of the condition (a).

If the ratio of the elastic recovery rate to the content of silica particles is less than 3.6, the seal member becomes hard and is difficult to return to its original state after being deformed. If the ratio exceeds 9.6, the seal member becomes soft and its mechanical strength decreases, making cut damages more likely to occur.

(b) Type A Durometer Hardness: 15 or More and 30 or Less

The type A durometer hardness may be measured by a method conforming to JIS K 6253-3:2012. If the type A durometer hardness is less than 15, the seal member will become soft and the mechanical strength will decrease, making cut damages more likely to occur. If the type A durometer hardness exceeds 30, the seal member becomes hard and it becomes difficult to insert and remove the counterpart member, making cut damages more likely to occur.

(c) Tensile Strength at Break: 2.1 MPa or More

The tensile strength at break may be measured by a method conforming to JIS K 6251:2017. Dumbbell No. 3 is used as a test piece. If the tensile strength at break is less than 2.1 MPa, the mechanical strength of the seal member will be reduced, making cut damages more likely to occur.

(d) Coefficient of Kinetic Friction of the Surfaces of the Insertion Holes: 2.5 or Less In this disclosure, as the coefficient of kinetic friction, a value measured using an automatic friction and wear analyzer ("Triboster 500," surface contactor manufactured by Kyowa Interface Science Co., Ltd.) is adopted. The measurement conditions are a load of 100 gf (0.98 N) and a tensile speed of 500 mm/min. If the coefficient of kinetic friction exceeds 2.5, the friction on the surface of the insertion hole (the surface in sliding contact with the counterpart member) increases, making cut damages more likely to occur. The coefficient of kinetic friction of the surface of the insertion hole is more preferably 2.0 or less.

[Manufacturing Method of Seal Member]

The seal member of the disclosure may be produced by curing a silicone rubber composition that includes a silicone rubber and silica particles. For example, a silicone rubber composition may be injected into a mold and heated to cure with an injection molding machine. The heating temperature may be about 140 to 170° C., and the curing time may be about 5 to 10 minutes.

EXAMPLE

Next, the disclosure will be described more specifically with reference to examples.
(1) Properties of Seal Member
<Production of Test Piece>

First, various silicone rubber compositions were prepared by blending predetermined raw materials in amounts shown in Tables 1 and 2 below and mixing them using a planetary mixer. Next, the prepared silicone rubber composition was cured by press molding at a temperature of 170° C. for 10 minutes to produce a test piece according to the method for measuring properties described later. The test pieces of Examples 1 to 10 shown in Table 1 are included in the concept of the seal member of the disclosure. Details of the raw materials used are as follows.

[Base Rubber]

Dimethylpolysiloxane A having a terminal vinyl group: "Polymer VS2000" manufactured by EVONIK, molecular weight 25,000.

Dimethylpolysiloxane B having a terminal vinyl group: "Polymer VS5000" manufactured by EVONIK, molecular weight 33,000.

Dimethylpolysiloxane C having a terminal vinyl group: "Polymer VS10000" manufactured by EVONIK, molecular weight 40,000.

Dimethylpolysiloxane D having a terminal vinyl group: "Polymer VS20000" manufactured by EVONIK, molecular weight 50,000.

Dimethylpolysiloxane E having a terminal vinyl group: "Polymer VS65000" manufactured by EVONIK, molecular weight 67,000.

Dimethylpolysiloxane F having a terminal vinyl group: "Polymer VS100000" manufactured by EVONIK, molecular weight 100,000.

Dimethylpolysiloxane G having a terminal vinyl group: "Polymer VS165000" manufactured by EVONIK, molecular weight 130,000.

Dimethylpolysiloxane H having a side-chain vinyl group: molecular weight 500,000.

Dimethylpolysiloxane I having a terminal vinyl group: molecular weight 480,000.

Dimethylpolysiloxane J having a terminal/side-chain vinyl group: molecular weight 500,000.

Among these vinyl group-containing dimethylpolysiloxanes, H to J were synthesized as follows.

(1) Dimethylpolysiloxane H Having a Side-Chain Vinyl Group

First, 74.7 g of octamethylcyclotetrasiloxane, 0.086 g of 2,4,6,8-tetramethyl 2,4,6,8-tetravinylcyclotetrasiloxane, and 0.1 g of potassium siliconate were placed in a vessel purged with argon gas and stirred at 120° C. for 30 minutes. Then, the temperature was raised to 155° C., and after continuing stirring for 3 hours, 0.1 g of hexamethyldisiloxane was added and stirred at 155° C. for 4 hours. After completion of the reaction, it was diluted with toluene and then washed with water three times. The washed organic layer was washed with methanol several times for reprecipitation purification to separate the oligomer and polymer. The obtained polymer was dried under vacuum overnight at 60° C. to obtain dimethylpolysiloxane H having a side-chain vinyl group.

(2) Dimethylpolysiloxane I Having a Terminal Vinyl Group

The synthesis method is the same as that of dimethylpolysiloxane H having a side-chain vinyl group of (1), except that 2,4,6,8-tetramethyl 2,4,6,8-tetravinylcyclotetrasiloxane was not used, and that 0.1 g of 1,3-divinyltetramethyldisiloxane was added instead of hexamethyldisiloxane, and dimethylpolysiloxane I having a terminal vinyl group was obtained.

(3) Dimethylpolysiloxane J Having a Terminal/Side-Chain Vinyl Group

The synthesis method is the same as that of dimethylpolysiloxane H having a side-chain vinyl group of (1), except that the blending amount of 2,4,6,8-tetramethyl 2,4,6,8-tetravinylcyclotetrasiloxane was set to 0.86 g, and that that 0.1 g of 1,3-divinyltetramethyldisiloxane was added instead of hexamethyldisiloxane, and dimethylpolysiloxane J having a terminal/side-chain vinyl group was obtained.

[Cross-Linking Agent]

Organohydrogen polysiloxane A: "KF-9901" manufactured by Shin-Etsu Chemical Co., Ltd.

Organohydrogen polysiloxane B: "TC-25D" manufactured by Momentive Inc.

[Silica Particles]

Silica particles: Hydrophobic fumed silica surface-treated with hexamethyldisilazane, "AEROSIL (registered trademark) RX200" manufactured by Nippon Aerosil Co., Ltd.

[Oil]

Phenyl group-containing silicone oil: "KF-53" manufactured by Shin-Etsu Chemical Co., Ltd.

Ether-modified silicone oil: "KF-354L" manufactured by Shin-Etsu Chemical Co., Ltd.

Liquid paraffin oil: "Liquid paraffin" manufactured by Fujifilm Wako Pure Chemical Cooperation.

[Catalyst]

Hydrosilylated platinum catalyst A: "Pt-VTSC-3.0X" manufactured by Umicore Japan Co., Ltd.

Hydrosilylated platinum catalyst B: "TC-25A" manufactured by Momentive Inc.

<Measurement Method of Properties>

The elastic recovery rate, type A durometer hardness, and the coefficient of kinetic friction of the cured product of the silicone rubber composition were measured using the manufactured test piece. Each measurement method is described below.

[Elastic Recovery Rate]

Using a microhardness tester ("FISCHERSCOPE (registered trademark) H100C" manufactured by Fischer Instrumentation Co., Ltd.) based on the indentation test method, an indenter was pressed into the surface of a square sheet-like test piece under the following measurement conditions, and a load-displacement curve was created. The size of the test piece is 30 mm in length on one side and 2 mm in thickness. The elastic deformation power $\eta_{IT}$ (%) is calculated from the above equation (i) by obtaining the plastic deformation ($W_{plast}$) and elastic deformation ($W_{elast}$) from the obtained load-displacement curve, and taking the total mechanical amount as $W_{total}$ ($=W_{plast}+W_{elast}$). The calculated elastic deformation power $\eta^{IT}$ (%) is referred to as the elastic recovery rate, and the value of the elastic recovery rate is divided by the content of silica particles (X parts by mass) relative to 100 parts by mass of the base polymer to obtain "elastic recovery rate (%)/X (parts by mass)" of the condition (a).

Measurement Condition

Indenter: Square vertical diamond indenter with a facing angle of 136°.
Initial load: 0 mN.
Pressing maximum load: 10 mN (constant load).
Maximum load reaching time: 3 seconds.
Maximum load holding time: 5 seconds.
Unloading time: 3 seconds.
Measurement temperature: 25° C.

[Type A Durometer Hardness]

The Type A durometer hardness of a 12 mm thick test piece was measured by a method conforming to JIS K 6253-3:2012.

[Tensile Strength at Break]

The tensile strength at break Tb (MPa) of a dumbbell No. 3 (thickness: 2 mm) test piece was measured by a method conforming to JIS K 6251:2017.

[Coefficient of Kinetic Friction]

The coefficient of kinetic friction of the surface of a square sheet-like test piece having a thickness of 2 mm and 30 mm square was measured using an automatic friction and wear analyzer ("Triboster 500," surface contactor manufactured by Kyowa Interface Science Co., Ltd.). The measurement conditions were a load of 100 gf (0.98 N) and a tensile speed of 500 mm/min. In Table 1, the test pieces of Examples 2, 4, 5, and 7 having "coated" in the oil column were measured by coating oil to the surfaces of the test pieces.

<Measurement Results of Properties>

Tables 1 and 2 summarize the raw materials used in the production of the test pieces and the measurement results of the properties.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Base polymer | Dimethylpolysiloxane A having a terminal vinyl group (molecular weight 25,000) | — | — | — | — | — | — | — | — | — | — |
| | Dimethylpolysiloxane B having a terminal vinyl group (molecular weight 33,000) | 100 | — | — | — | — | — | — | — | — | — |
| | Dimethylpolysiloxane C having a terminal vinyl group (molecular weight 40,000) | — | 100 | 100 | 100 | 100 | — | — | — | — | — |
| | Dimethylpolysiloxane D having a terminal vinyl group (molecular weight 50,000) | — | — | — | — | — | 100 | 100 | — | — | — |
| | Dimethylpolysiloxane E having a terminal vinyl group (molecular weight 67,000) | — | — | — | — | — | — | — | 100 | 100 | — |
| | Dimethylpolysiloxane F having a terminal vinyl group (molecular weight 100,000) | — | — | — | — | — | — | — | — | — | 100 |
| | Dimethylpolysiloxane G having a terminal vinyl group (molecular weight 130,000) | — | — | — | — | — | — | — | — | — | — |
| | Dimethylpolysiloxane H having a side-chain vinyl group (molecular weight 500,000) | — | — | — | — | — | — | — | — | — | — |
| | Dimethylpolysiloxane I having a terminal vinyl group (molecular weight 480,000) | — | — | — | — | — | — | — | — | — | — |
| | Dimethylpolysiloxane J having a terminal/side-chain vinyl group (molecular weight 500,000) | — | — | — | — | — | — | — | — | — | — |
| Cross-linking agent | Organohydrogen polysiloxane A | 1.68 | 1.4 | 1.4 | 1.4 | 1.4 | 1.12 | 1.12 | 0.83 | 0.83 | 0.56 |
| | Organohydrogen polysiloxane B | — | — | — | — | — | — | — | — | — | — |
| | Silica particle | 10 | 10 | 20 | 20 | 20 | 25 | 25 | 10 | 20 | 20 |

TABLE 1-continued

|  |  | Example | | | | | | | | | |
|---|---|---|---|---|---|---|---|---|---|---|---|
|  |  | 1 | 2 | 3 | 4 | 5 | 6 | 7 | 8 | 9 | 10 |
| Oil | Phenyl group-containing silicone oil | 10 | coated | 4.0 | — | — | 4.0 | coated | 4.0 | 4.0 | 4.0 |
|  | Ether-modified silicone oil | — | — | — | coated | — | — | — | — | — | — |
|  | Liquid paraffin oil | — | — | — | — | coated | — | — | — | — | — |
| Catalyst | Hydrosilylated platinum catalyst A | 0.05 | 0.05 | 0.05 | 0.05 | 0.05 | 0.05 | 0.05 | 0.05 | 0.05 | 0.05 |
|  | Hydrosilylated platinum catalyst B | — | — | — | — | — | — | — | — | — | — |
| Property | (a) Elastic recovery rate [%]/silica particle amount (parts by mass) | 9.4 | 9.6 | 4.4 | 4.4 | 4.4 | 3.6 | 3.7 | 8.6 | 4.3 | 4.2 |
|  | (b) Type A durometer hardness | 30 | 23 | 30 | 27 | 27 | 20 | 21 | 15 | 24 | 16 |
|  | (c) Tensile strength at break [MPa] | 2.1 | 2.3 | 4.4 | 5.1 | 5.1 | 7.0 | 6.6 | 2.2 | 5.1 | 4.0 |
|  | (d) Coefficient of kinetic friction | 0.5 | 0.5 | 0.9 | 0.8 | 0.7 | 0.9 | 0.7 | 1.3 | 1.1 | 1.7 |
| Evaluation | Number of cut damages | 11 | 9 | 3 | 4 | 3 | 2 | 4 | 5 | 1 | 18 |

TABLE 2

|  |  | Comparative Example | | | | | | | | |
|---|---|---|---|---|---|---|---|---|---|---|
|  |  | 1 | 2 | 3 | 4 | 5 | 6 | 7 | 8 | 9 |
| Base polymer | Dimethylpolysiloxane A having a terminal vinyl group (molecular weight 25,000) | 100 | — | — | — | — | — | — | — | — |
|  | Dimethylpolysiloxane B having a terminal vinyl group (molecular weight 33,000) | — | — | — | — | — | — | — | — | — |
|  | Dimethylpolysiloxane C having a terminal vinyl group (molecular weight 40,000) | — | — | 100 | — | 100 | 100 | — | — | — |
|  | Dimethylpolysiloxane D having a terminal vinyl group (molecular weight 50,000) | — | — | — | 100 | — | — | — | — | — |
|  | Dimethylpolysiloxane E having a terminal vinyl group (molecular weight 67,000) | — | — | — | — | — | — | — | — | — |
|  | Dimethylpolysiloxane F having a terminal vinyl group (molecular weight 100,000) | — | — | — | — | — | — | — | — | — |
|  | Dimethylpolysiloxane G having a terminal vinyl group (molecular weight 130,000) | — | 100 | — | — | — | — | — | — | — |
|  | Dimethylpolysiloxane H having a side-chain vinyl group (molecular weight 500,000) | — | — | — | — | — | — | — | 80 | — |
|  | Dimethylpolysiloxane I having a terminal vinyl group (molecular weight 480,000) | — | — | — | — | — | — | 80 | 80 | — |

TABLE 2-continued

|  |  | Comparative Example | | | | | | | | |
|---|---|---|---|---|---|---|---|---|---|---|
|  |  | 1 | 2 | 3 | 4 | 5 | 6 | 7 | 8 | 9 |
|  | Dimethylpolysiloxane J having a terminal/side-chain vinyl group (molecular weight 500,000) | — | — | — | — | — | — | 20 | 20 | 20 |
| Cross-linking agent | Organohydrogen polysiloxane A | 2.24 | 0.42 | 1.4 | 1.12 | 1.4 | 1.4 | — | — | — |
|  | Organohydrogen polysiloxane B | — | — | — | — | — | — | 1.4 | 4.0 | 2.6 |
|  | Silica particle | 10 | 20 | 0.1 | 10 | 30 | 20 | 25 | 20 | 35 |
| Oil | Phenyl group-containing silicone oil | 4.0 | 4.0 | 4.0 | 4.0 | 4.0 | — | — | — | — |
|  | Ether-modified silicone oil | — | — | — | — | — | — | — | — | — |
|  | Liquid paraffin oil | — | — | — | — | — | — | — | — | — |
| Catalyst | Hydrosilylated platinum catalyst A | 0.05 | 0.05 | 0.05 | 0.05 | 0.05 | 0.05 | — | — | — |
|  | Hydrosilylated platinum catalyst B | — | — | — | — | — | — | 0.4 | 0.4 | 0.3 |
| Property | (a) Elastic recovery rate [%]/silica particle amount (parts by mass) | 9.5 | 3.5 | 970 | 9.7 | 2.8 | 4.6 | 3.7 | 4.9 | 2.6 |
|  | (b) Type A durometer hardness | 35 | 21 | 14 | 24 | 37 | 27 | 38 | 36 | 38 |
|  | (c) Tensile strength at break [MPa] | 2.9 | 4.6 | 0.5 | 2.0 | 6.0 | 5.1 | 6.1 | 7.5 | 7.6 |
|  | (d) Coefficient of kinetic friction | 0.7 | 1.9 | 0.9 | 0.9 | 1 | 2.7 | 2.9 | 2.7 | 2.6 |
| Evaluation | Number of cut damages | 25 | 70 | 81 | 28 | 26 | 21 | 41 | 22 | 64 |

As shown in Table 1, the cured products of Examples 1 to 10 satisfied all four conditions (a) to (d). In addition, as shown in Table 2, according to the cured products of Comparative Examples 1 to 9, which differ from Examples 1 to 10 in terms of the molecular weight of the base polymer, the blending amount of silica particles, and the presence or absence of oil, some of the four conditions (a) to (d) were not satisfied. For example, the cured product of Comparative Example 1 has a lower molecular weight of the base polymer than the cured product of Example 8. As a result, the type A durometer hardness increased. The cured product of Comparative Example 2 has a higher molecular weight of the base polymer than the cured products of Examples 3, 9 and 10. As a result, the ratio of the elastic recovery rate to the content of silica particles became small. The cured product of Comparative Example 3 contains less silica particles than the cured product of Example 3. As a result, the ratio of elastic recovery rate to silica particle content increased, and the type A durometer hardness and tensile strength at break decreased. On the contrary, the cured product of Comparative Example 5 contains more silica particles than the cured product of Example 3. As a result, the ratio of elastic recovery rate to silica particle content decreased and type A durometer hardness increased. The cured product of Comparative Example 4 contains less silica particles than the cured product of Example 6. As a result, the ratio of elastic recovery rate to silica particle content increased, and the tensile strength at break decreased. The cured product of Comparative Example 6 does not have an oil film on its surface. As a result, compared with the cured products of Examples 3-5, the coefficient of kinetic friction of the surface increased. The cured products of Comparative Examples 7 to 9 have a base polymer with a large molecular weight and do not have an oil film on the surface. Therefore, the coefficient of kinetic friction of the surface increases, and the type A durometer hardness of the cured products of Comparative Examples 8 and 9 increased, and the ratio of the elastic recovery rate to the silica particle content of the cured product of Comparative Example 9 also decreased.

<Scratch Resistance Evaluation of Seal Member>

Figure 3:
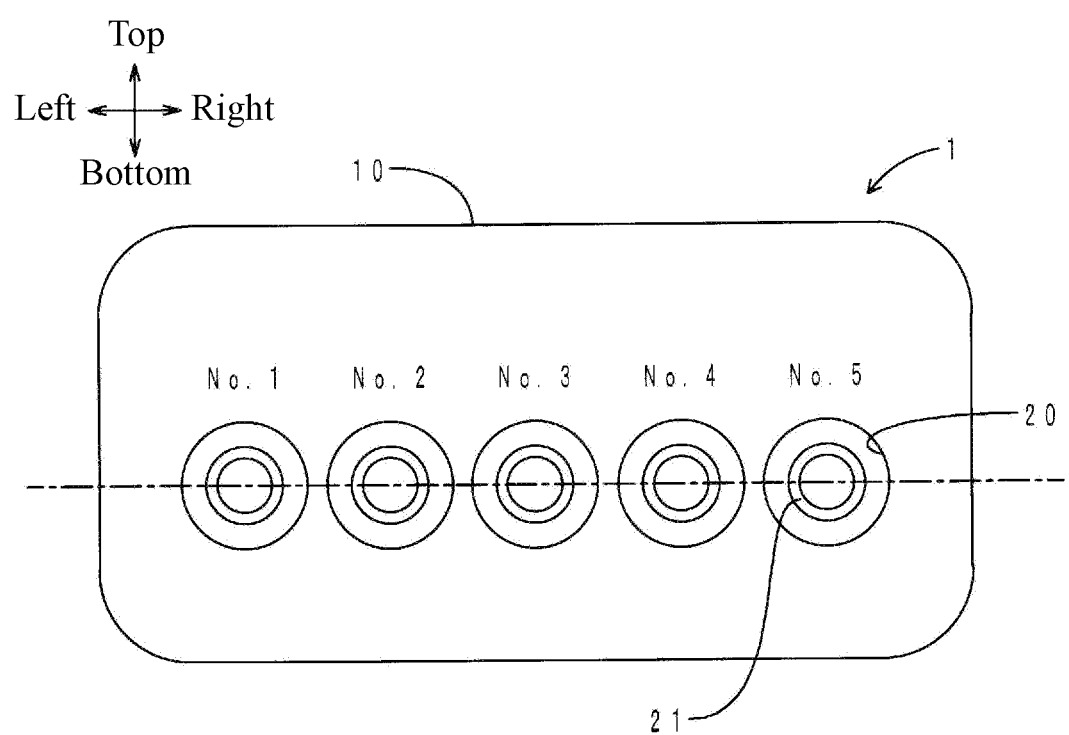
FIG. 3 is an illustration view of a scratch resistance evaluation method of the mat seal.

Various silicone rubber compositions were prepared according to the formulations shown in Tables 1 and 2 in the same manner as in the production of the test pieces described above, and the silicone rubber compositions were press-molded to produce the mat seal 1 of the above embodiment (see FIGS. 1 and 2 above). In Table 1, for the mat seals of Examples 2, 4, 5, and 7 having "coated" in the oil column, oil was coated to the surface (inner peripheral surface) of the insertion hole of the manufactured mat seal. The mat seals of Examples 1 to 10 shown in Table 1 are included in the concept of the seal member of the disclosure. The manufactured mat seal was set in the housing, and the terminal was inserted and removed to evaluate the difficulty of cut damages (scratch resistance). The evaluation method is as follows. FIG. 3 shows an illustration view of a scratch resistance evaluation method of the mat seal. FIG. 3 corresponds to FIG. 1 above.

As shown in FIG. 3, the five insertion holes 20 formed in the mat seal 1 are numbered No. 1 to 5 in order from the left side. First, the terminals of the terminal-equipped wires were inserted in order from No. 1 to No. 5, and then the wires were pulled out in order from No. 5 to No. 1. After repeating this operation three times, the part of the insertion holes 20 of the mat seal 1 was cut in the left and right direction as indicated by the dashed line in FIG. 3, and the number of cut damages formed on the surfaces (inner peripheral surfaces) of the five insertion holes 20 was counted.

The results are summarized in Tables 1 and 2 above. As shown in Table 1, the mat seals of Examples 1 to 10, which satisfy all four conditions (a) to (d), had 20 or less cut damages, whereas the mat seals of Comparative Examples 1-9, which do not satisfy any one of the conditions (a) to (d), had more than 20 cut damages. From the above, it was confirmed that in the seal member of the disclosure, it is difficult for the insertion hole to be damaged by the insertion and removal of the counterpart member.

INDUSTRIAL APPLICABILITY

The seal member of the disclosure may be applied to various parts in the fields of automobiles, industrial equipment, information communication equipment, and the like. In particular, it is suitable for multi-polar rubber plugs such as waterproof connectors, multi-hole rubber bushes, multi-hole grommets, and the like.

What is claimed is:

1. A seal member comprising a plurality of insertion holes into which counterpart members are inserted,
    wherein the seal member is a cured product of a silicone rubber composition comprising a silicone rubber and silica particles and satisfies following conditions (a) to (d):
    (a) if X parts by mass is the content of the silica particles relative to 100 parts by mass of a base polymer of the silicone rubber, elastic recovery rate (%)/X (parts by mass)=3.6 to 9.6;
    (b) the type A durometer hardness is 15 or more and 30 or less;
    (c) the tensile strength at break is 2.1 MPa or more; and
    (d) the coefficient of kinetic friction of a surface of the insertion hole is 2.5 or less.

2. The seal member according to claim 1, wherein the base polymer of the silicone rubber comprises an organopolysiloxane having at least two alkenyl groups in one molecule, and the silicone rubber composition comprises a cross-linking agent having a hydrosilyl group (SiH group).

3. The seal member according to claim 1, further comprising an oil film disposed on at least a part of the surface of the insertion hole.

4. The seal member according to claim 3, wherein the silicone rubber composition comprises oil, and the oil film is formed by bleeding the oil onto the surface of the insertion hole.

5. The seal member according to claim 3, wherein the oil film is formed by coating oil to the surface of the insertion hole.

6. The seal member according to claim 3, wherein the oil film comprises one or more selected from phenyl group-containing oil, ether-modified oil, and liquid paraffin oil.

7. The seal member according to claim 1, wherein the base polymer of the silicone rubber has a molecular weight of 33,000 or more and 100,000 or less.

8. The seal member according to claim 1, wherein the seal member comprises a flat plate-like body, and the plurality of insertion holes are respectively formed through the body in a thickness direction of the body, and
    a distance between adjacent insertion holes is 1.3 mm or more and 8.8 mm or less when the body is viewed from an insertion direction of the counterpart member.

9. The seal member according to claim 1, wherein the counterpart member is made of metal and comprises a corner.

* * * * *